United States Patent
Grigsby, Jr. et al.

(10) Patent No.: US 7,229,003 B2
(45) Date of Patent: Jun. 12, 2007

(54) BULK MATERIALS CONTAINER

(75) Inventors: John M. Grigsby, Jr., Woodstock, GA (US); Jeffrey C. Banks, Austell, GA (US)

(73) Assignee: North American Container Corp., Mableton, GA (US)

( * ) Notice: Subject to any disclaimer, the term of this patent is extended or adjusted under 35 U.S.C. 154(b) by 0 days.

(21) Appl. No.: 11/000,344

(22) Filed: Nov. 30, 2004

(65) Prior Publication Data
US 2006/0113365 A1 Jun. 1, 2006

(51) Int. Cl.
*B65D 5/42* (2006.01)
*B65D 5/50* (2006.01)
*B65D 43/02* (2006.01)

(52) U.S. Cl. .......................... 229/122.34; 229/122.27; 229/122.32; 229/122.33; 229/199; 229/199.1

(58) Field of Classification Search ................ 229/199, 229/122.27, 122.32, 122.33, 122.34, 199.1; 206/386, 600
See application file for complete search history.

(56) References Cited

U.S. PATENT DOCUMENTS

| | | | | |
|---|---|---|---|---|
| 1,410,622 A | * | 3/1922 | Swift, Jr. ..................... | 229/199 |
| 1,417,776 A | * | 5/1922 | Shafer ......................... | 229/199 |
| 1,497,713 A | * | 6/1924 | Crowell ....................... | 229/199 |
| 1,524,292 A | * | 1/1925 | Dinsmoor .................... | 229/199 |
| 1,600,396 A | * | 9/1926 | Campbell et al. ............ | 229/199 |
| 1,839,283 A | * | 1/1932 | Walker et al. ............... | 229/199 |
| 3,355,081 A | * | 11/1967 | Kachurchak ................. | 229/199 |
| 4,635,815 A | * | 1/1987 | Grigsby .................. | 229/122.33 |
| 4,702,408 A | * | 10/1987 | Powlenko .................... | 229/199 |
| 5,622,306 A | * | 4/1997 | Grigsby, Sr. ............ | 229/122.27 |
| 6,126,067 A | * | 10/2000 | Grigsby et al. ........... | 229/199.1 |
| 6,578,758 B1 | | 6/2003 | Grigsby, Jr. et al. | |
| 6,808,106 B1 | * | 10/2004 | Grigsby et al. ............. | 229/120 |

OTHER PUBLICATIONS

Wood-Cleated Corrugated brochure, North American Container Corp. (undated; prior to Nov. 30, 2004).

* cited by examiner

*Primary Examiner*—Gary E. Elkins
(74) *Attorney, Agent, or Firm*—Baker, Donelson, Bearman, Caldwell & Berkowitz

(57) ABSTRACT

A reinforced bulk materials container having a first wall-forming blank scored to provide main panels foldably joined together at a plurality of corners with each main panel having a foldably joined bottom flap. A wear reducing member attaches along the score for the bottom flaps and overlaps lateral portions of the flaps and the panels. A second wall-forming blank of corrugated paperboard defining panels laminates to the first wall-forming blank and includes members fixedly attached about a perimeter of each panel and a filler pad within the perimeter defined by the members. The wear reducing member resists the bottom edges of the container from wearing through caused movement of the container on rough surfaces.

9 Claims, 3 Drawing Sheets

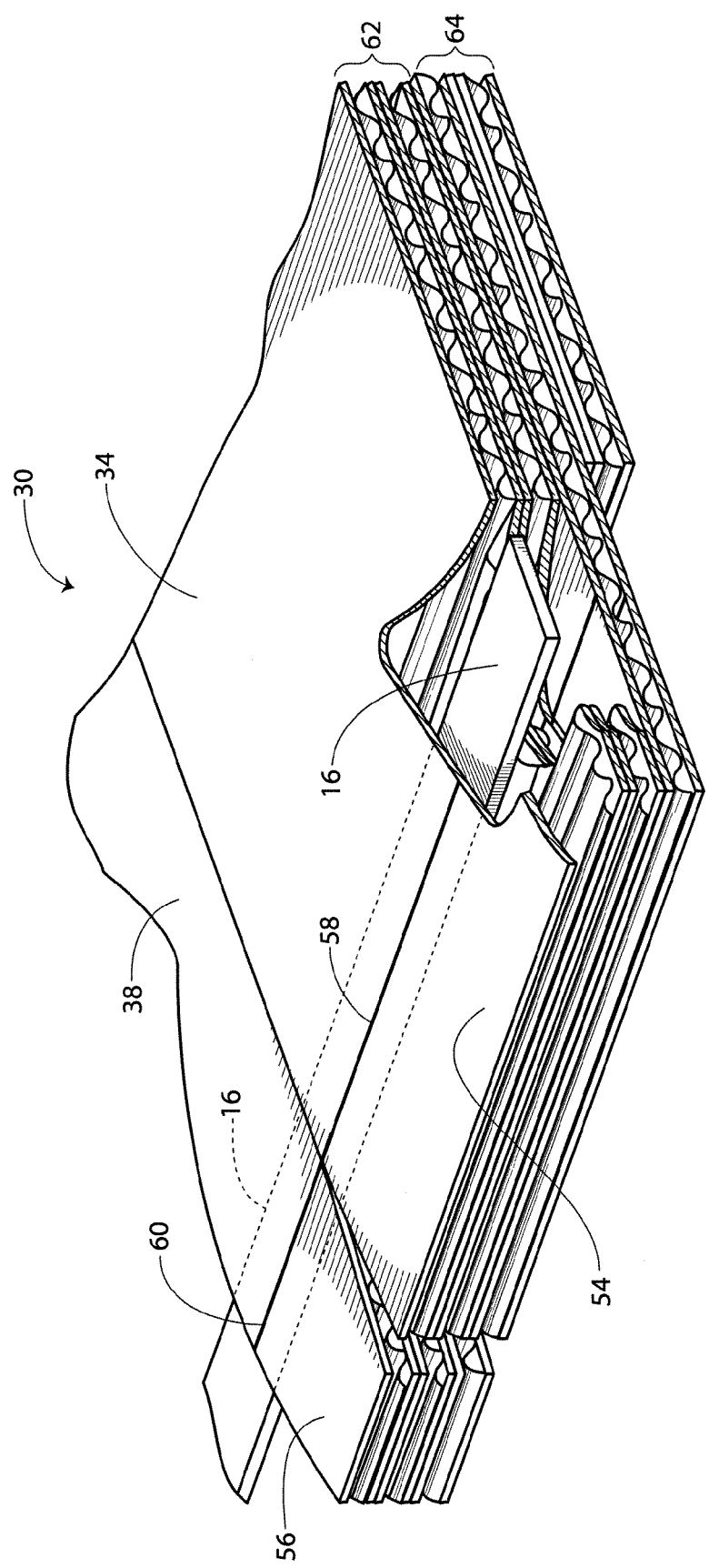

BULK MATERIALS CONTAINER

TECHNICAL FIELD

The present invention relates to containers for holding and storing bulk materials. More particularly, the present invention relates to bulk material containers with wear reducing members to facilitate handling of the container in warehouses and transport vehicles.

BACKGROUND OF THE INVENTION

Large-volume containers are often used for holding, storing, and transporting bulk materials, such as powders, agriculture leaf and root crop products, metal castings, plastic resins, and many other materials. Generally, the containers provide sturdy walls that protect the bulk materials from entry of pests and from container failure while allowing the containers to be handled by equipment such as fork lift trucks and platen or clamp trucks. The containers are also often stacked in warehouses.

Notwithstanding such equipment for handling bulk material containers, edges of these containers tend to become torn or cut, particularly when the containers are empty and thus movable relatively easily by hand. Unfortunately, the containers are dragged with a bottom edge against a rough floor of warehouses, loading docks, and trailers.

Accordingly, there is a need in the art for an improved bulk materials container that provides side wall strength and resists premature wear on portions that are subject to contact with rough surfaces. It is to such that the present invention is directed.

BRIEF SUMMARY OF THE INVENTION

The present invention solves the above-described problems in the prior art by providing a reinforced bulk material container having a first wall-forming blank of corrugated paperboard made of at least a flute member sandwiched between opposing exterior and interior paperboard sheets and scored to provide a series of main panels foldably joined together at a plurality of corners with each main panel having a bottom flap foldably joined to an edge portion. A wear reducing member attaches to one of the paperboard sheets of the first wall-forming blank along the foldable connection of the bottom flaps and the main panels and overlapping lateral portions of the flaps and the panels. A second wall-forming blank of corrugated paperboard laminates to the interior surface of the first wall-forming blank. The second wall-forming blank of corrugated paperboard is scored to provide a series of main panels foldably joined together at a plurality of corners. The second wall-forming blank define a front surface and a back surface. A plurality of members fixedly attach about a perimeter of each main panel on the front surface of the second wall-forming blank and a filler pad attaches to each main panel of the second wall-forming blank within the perimeter defined by the support members. The second wall-forming blank attaches to the interior surface of the first wall-forming blank to dispose the supports and the filler pad between the interior surface of the first wall-forming blank and the front surface of the second wall-forming blank with the wear reducing member in aligned laminating engagement relative to a bottom one of the support members. The wear reducing member resists the bottom edges of the container from wearing through caused movement of the container on rough surfaces.

Objects, advantages and features of the present invention will become apparent from a reading of the following detailed description of the invention and claims in view of the appended drawings.

BRIEF DESCRIPTION OF THE DRAWINGS

FIG. 3 is a detailed cut-away view of the corrugated paperboard blank in FIG. 2.

DETAILED DESCRIPTION

Figure 1:
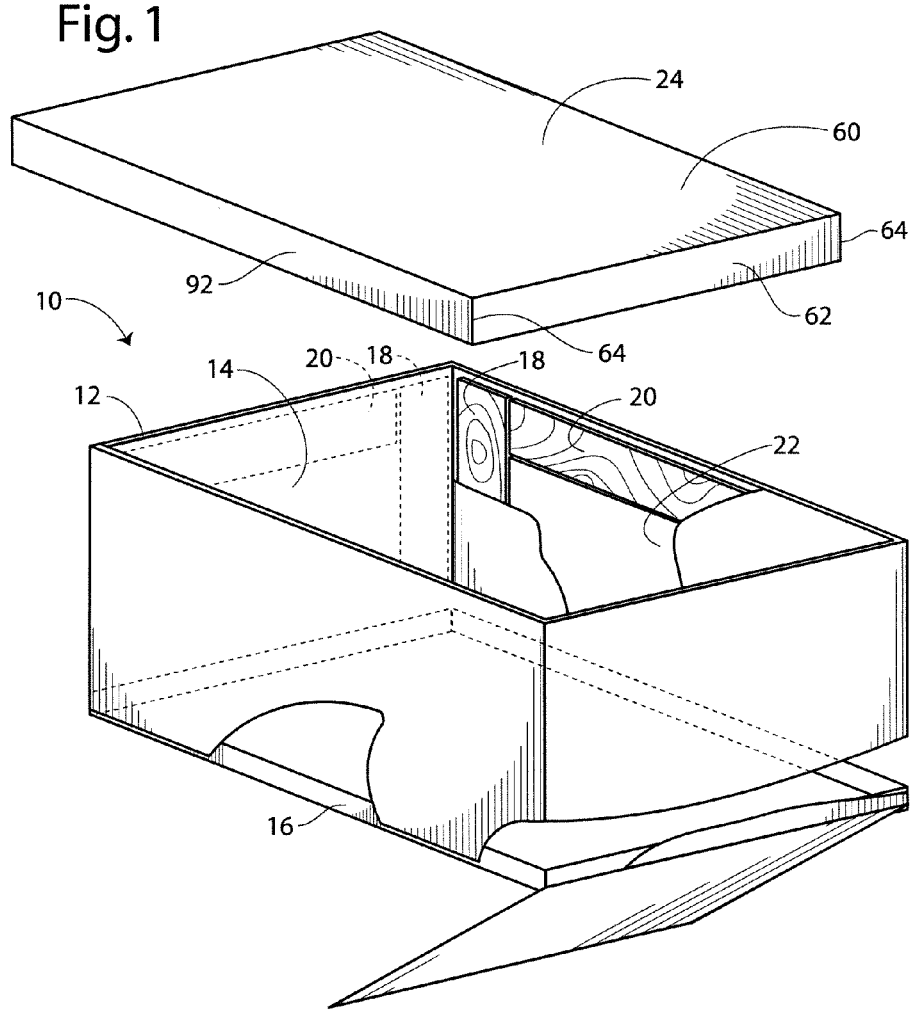
FIG. 1 is a perspective view of a bulk materials container according to the present invention, with portions cut away to illustrate features of the container.

Referring now in more detail to the drawings, in which like numerals indicate like parts throughout the several views, FIG. 1 illustrates in cut-away perspective a container 10 of the present invention for holding bulk materials. The container 10 defines an outer wall generally 12 and inner wall generally 14 each made from blanks of sheet material such as corrugated paperboard made conventionally with fluted sheet sandwiched by linerboard also known as paperboard or fiberboard.

The outer wall 12 includes a wear member 16 that extends around a perimeter bottom edge of the container 12 and overlaps lateral portions of the wall panels and bottom flaps, as discussed below. The inner wall 14 includes opposing vertical members 18 and opposing horizontal members 20 in each panel comprising the wall. The members 18 and 20 cooperatively define a "picture frame" about a perimeter of the panel. A filler panel 22 attaches to the wall within the volume defined by the members 18, 20, as discussed below. A cap 24 closes an open end of the container 10 while bottom flaps discussed below close the bottom of the container.

Figure 2:
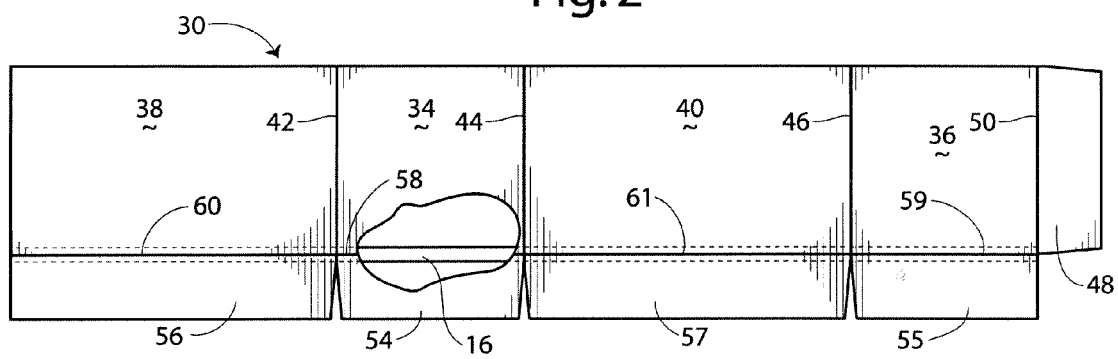
FIG. 2 is a plan view of a corrugated paperboard blank for forming an outer shell of the container shown in FIG. 1.

FIG. 2 illustrates in plan view a corrugated paperboard blank 30 for forming the outer wall 12 of the container 10. With reference to both FIGS. 1 and FIG. 2, the blank 30 includes two opposing end panels 34, 36 and two opposing side panels 38, 40 foldably connected along scores 42, 44, and 46. The end panels 34, 36 and the side panels 38, 40 define the sides of the container 10 shown in FIG. 1. A manufacturer's joint flap 48 foldably connects on a score 50 to the end panel 36. The manufacturer's joint flap 58 attaches with adhesive to a side portion of the side panel 38 to form a tubular body for the container 10. The scores 42, 44, 46, and 50 permit the container 10 to substantially flatten to a knock-down position for shipping from a container manufacturer to a company using the container. For use, the container 10 is squared-open as in FIG. 1 to define a cavity 53 for holding bulk materials.

Figure 2A:
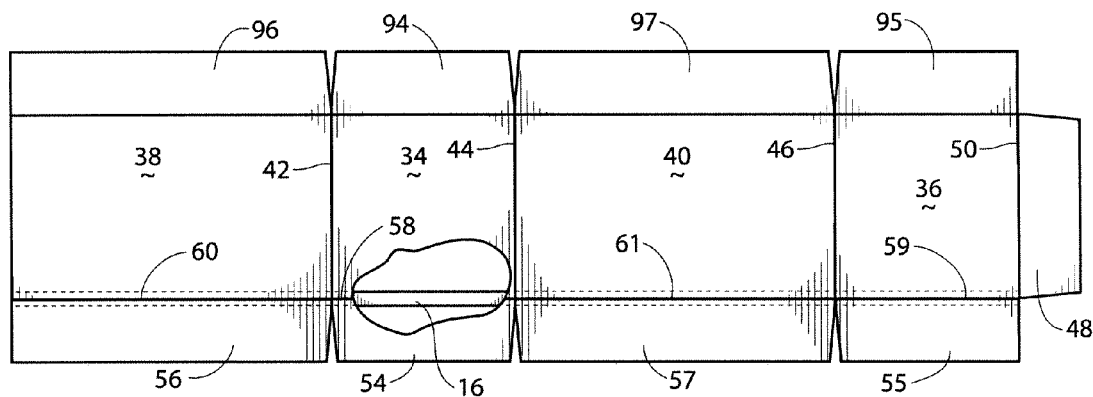
FIG. 2A is a plan view of an alternate embodiment of a corrugated paperboard blank for forming an outer shell of the container shown in FIG. 1.

FIG. 2 further shows a series of four bottom flaps 54, 55, 56, and 57 foldably attached to the end and side panels 34, 36, 38, and 40, respectively, along scores 58, 59, 60, and 61. In an alternate embodiment illustrated in FIG. 2A, the blank 30 defines four opposing foldable top flaps 94, 95, 96, and 97 along scores in the blank 30 on an opposing side of the end and side panels, respectively. The top flaps 94, 95, 96, and 97 foldably overlap over an upper edge of the second wall-forming blank 72.

As shown in cut-away view, the wear member 16 attaches to the corrugated paperboard blank 30 along the scores 58, 59, 60, and 61 and overlapping portions of the bottom flaps 54, 55, 56, and 57 and portions of the end and side panels 34, 36, 38, and 40 lateral of the scores. The wear member 16 resists wear caused by contact with rough surfaces as the container 10 is moved and handled in warehouses or in trailers. The wear member 16 is an elongate member, such as a polyethylene tape, a fiber-reinforced tape, a plate such as metal or plastic, and attached adhesively to the blank 30.

FIG. 3 illustrates a detailed cut-away view of a portion of the blank 30 in embodiment in which the outer wall 12 is made of double wall corrugated paperboard 62, 64. Corrugated paperboard conventionally includes fluted sheet sandwiched between linerboard, fiberboard, or paperboard sheets. The wear member 16 in the illustrated embodiment attaches between the sheets of corrugated paperboard 62, 64 and extends parallel to the score that defines the bottom flap for the panel.

Figure 4:
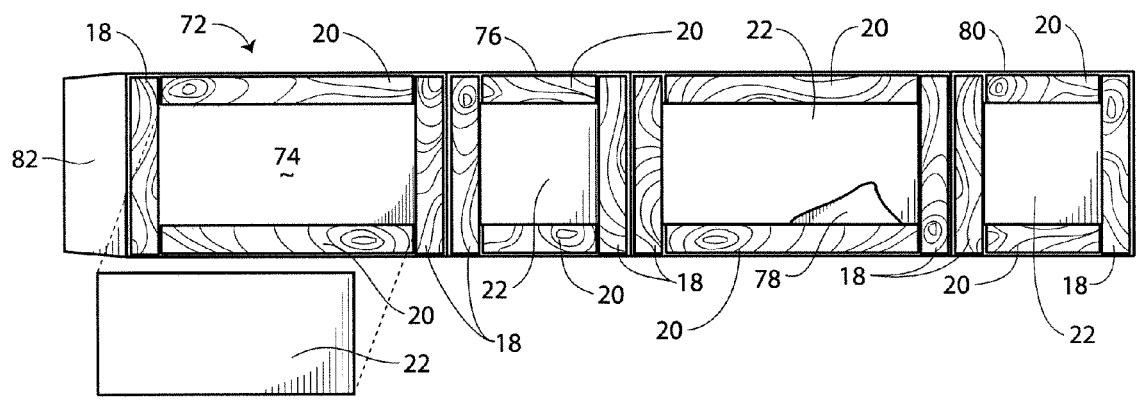
FIG. 4 is a plan view of a corrugated paperboard blank for forming an inner wall portion of the container shown in FIG. 1.

FIG. 4 shows a blank 72 of sheet-like material suitable for forming the inner wall 14, such as corrugated paperboard. The blank 72 includes four main panels 74, 76, 78, and 80, defined by scores in the blank. The main panels 74, 76, 78, and 80 form the four inner side walls of the container 10 when the inner wall 14 is bonded to the outer shell 12. The blank 72 provides a joint flap 82 foldably connected to the main panel 74 along a score line 84. The joint flap 82 attaches with adhesive to a side portion of the panel 80.

The vertical and horizontal members 18, 20 attach with adhesive to a first side surface of the blank 72 about perimeters of each main panel 74, 76, 78 and 80. The members 154, 156 may be formed of any suitably rigid material. A particularly preferred material is a wood veneer, typically ranging in thickness from ⅛ inch to ½ inch and in width from 2 and ¾ inches to 3 and ¾ inches. The length of the members 18 depends upon the height of the container 10. Preferably, the length of the vertical members 18 is substantially equal to the height of the inner wall 14, which is, in turn, substantially equal to the interior or inside height of the container 10.

The vertical members 18 provide support for the corners when the container 10 is squared-open and erected for use. The members 18 are disposed close to the corners defined by the scores 42, 44, 46, and 50, but not so close as to prevent the container from being folded down into a substantially flat position. Additionally, to further increase container rigidity and compression strength, a support member may be bonded near the center or otherwise intermediate of the outer ends of the main panels 74, 76, 78, and 80 (not illustrated).

The inner wall 14 further includes four filler pads 22 with one attached to each of the main panels 74, 76, 78, and 80. The filler pads 22 are formed of any suitably rigid sheet material, such as corrugated paperboard. The thickness is preferably equal to that of the members 18 and 20. The filler pads 22 attach to the blank 72 with adhesive or other suitable bonding material. The filler pads 22 fill the volume defined by the perimeter of the members 18, 20, to provide a substantially planar face for the inner wall 14 which adheres to the shell 12, as discussed below.

In an alternate embodiment, the members 18, 20 and the filler pads 22 are covered by a blank of corrugated paperboard sheet.

FIG. 1 further shows the cap 24 positioned immediately above the container 10. The cap 24 may be formed of any suitable material, such as corrugated paperboard blank, and is provided for closing off the top of the container 10. Thus, the cap 24 is dimensioned so as to fit snugly over the open end or top of the container 10. The cap member 24 made with corrugated fiberboard defines a main panel 90 with side flaps 92 foldably joined along scores and connected conventionally at corners, such as with tape or interlocking portions.

Those skilled in the art will recognize that FIG. 1 shows no bottom support member such as a pallet or a slip sheet under the bottom of the container 10. Various bottom support members could be provided including, but not limited to, pallets, slip sheets and bottom caps. Such bottom support members are well known in the art, and are not disclosed further herein. Thus, it is to be understood that the present invention has applications other than through conventional corrugated paperboard containers. For example, the present invention may take the form of a tube-like container consisting of only side walls with no top or bottom flaps, but having top and bottom caps similar to the top cap 24.

The container 10 assembles from the outer wall 12 and the inner wall 14. With the members 18, 20 and the filler pads 22 attached to the inner wall 14, the inner wall then attaches to outer wall 12 with adhesive. An adhesive is applied, such as by extruding, rolling, or spraying an adhesive material from a supply onto either the outer wall 12 or the supports 18, 20 and the filler pads 22 on the side of the inner wall 14. The blanks are then aligned together and passed through a compression device, thereby bonding same. As can be appreciated, the wear member 16 is thereby disposed in aligned laminating engagement relative to a bottom one of the support members 20. In the embodiment illustrated in FIGS. 1 and 2, the wear member 16 laminates directly to the support member 20 while in the embodiment shown in FIG. 3, the wear member is laminated aligned with the bottom support member 20.

The joint tabs 48 and 82 are then adhered to respective surfaces of the panels 38 and 80, to form a tubular, collapsible container 10 illustrated in FIG. 1.

Prior to use, the knocked-down container 10 is squared-open to define the cavity for receiving bulk materials. The bottom flaps are folded towards the respective opposing flap on the respective scores to close the open lower end of the container 10. Upon filling, the cap 24 is placed on the container 10.

The present invention provides an improved bulk materials container suitable for holding agriculture and leaf products, granular materials, bulk particulate materials, or other bulk items requiring long-term storage. The containers can be moved across rough floors and the wear member 16 resists tear-through or holes for increased periods of typical use. An alternate embodiment however does not include the wear member, but rather provides a container with increased wall strength. The members 18, 20 provide the container 10 with side wall rigidity for stacking strength, bulge resistance, and side wall strength for handling of the container 10 such as by clamp trucks. Disposing the support members 18, 20 between the outer wall 122 and the inner wall 14 restricts the bulk materials stored within the container 10 from being disturbed or damaged by the members during filling, handling, and storage of the containers. The present invention furthermore provides a one-piece, integral unit that can be knocked down flat for shipment to an end user and easily and quickly set up by an end user.

This specification has described the preferred embodiments of the present invention, including the steps necessary for fabricating the preferred embodiments disclosed. It is to be understood, however, that numerous changes and variations may be made in the construction of the present container within the spirit and scope of the present invention. It should therefore also be understood that the foregoing specification relates only to the preferred embodiments of the present invention and that modifications and changes may be made therein without departing from the scope thereof as set forth in the appended claims.

What is claimed is:

1. A reinforced bulk material container, comprising:
   a first wall-forming blank of corrugated paperboard having at least a flute member sandwiched between opposing exterior and interior paperboard sheets and scored to provide a series of main panels foldably joined together at a plurality of corners and each main panel having a bottom flap foldably joined to an edge portion thereof;
   a wear reducing member attached to one of the paperboard sheets of the first wall-forming blank along the foldable connection of the bottom flaps and the main panels and overlapping lateral portions thereof;
   a second wall-forming blank of corrugated paperboard laminated to the interior surface of the first wall-forming blank, the second wall-forming blank of corrugated paperboard scored to provide a series of main panels foldably joined together at a plurality of corners, said second wall-forming blank defining a front surface and a back surface;
   a plurality of support members fixedly attached about a perimeter of each main panel on the front surface of the second wall-forming blank;
   a filler pad bonded to each main panel of the second wall-forming blank within the perimeter defined by the support members;
   the second wall-forming blank laminated to the interior surface of the first wall-forming blank to dispose the supports and the filler pad between the interior surface of the first wall-forming blank and the front surface of the second wall-forming blank with the wear reducing member in aligned laminating engagement relative to a bottom one of the support members,
   whereby the wear reducing member resists the bottom edges of the container from wearing through caused movement of the container on rough surfaces.

2. The reinforced bulk material container as recited in claim 1, wherein the filler being formed of corrugated paperboard.

3. The reinforced bulk material container as recited in claim 1 further comprising a plurality of top flaps foldably joined to an upper edge portion of the main panels of the first wall-forming blank for being foldably overlapped over an upper edge of the second wall-forming blank.

4. The reinforced bulk material container as recited in claim 1, wherein the wear reducing member laminates directly to a bottom one of the support members.

5. The reinforced bulk material container as recited in claim 1, wherein the wear reducing member laminates directly to potions of a bottom one and adjacent perpendicular ones of the support members.

6. The reinforced bulk material container as recited in claim 1, wherein the wear reducing member comprises a material made of plastic.

7. The reinforced bulk material container as recited in claim 1, wherein the wear reducing member comprises a material made of a fiber-reinforced material.

8. The reinforced bulk material container as recited in claim 1, wherein the wear reducing member comprises a material made of polyethelene.

9. The reinforced bulk material container as recited in claim 1, wherein the wear reducing member comprises a metal strip.

* * * * *